United States Patent [19]

Mukawa

[11] Patent Number: 5,598,391
[45] Date of Patent: Jan. 28, 1997

[54] APPARATUS FOR RECORDING DATA AND STATICALLY STORING AND RECORDING SUPERVISORY INFORMATION REPRESENTING CONTENTS OF THE DATA ON A RECORDING MEDIUM

[75] Inventor: Hiroshi Mukawa, Kanagawa, Japan

[73] Assignee: Sony Corporation, Tokyo, Japan

[21] Appl. No.: 329,242

[22] Filed: Oct. 26, 1994

[30] Foreign Application Priority Data

Oct. 27, 1993 [JP] Japan .................. 5-289852

[51] Int. Cl.⁶ ................................... G11B 7/00
[52] U.S. Cl. ................. 369/54; 369/47; 369/58
[58] Field of Search ................. 369/47, 48, 54, 369/58, 32, 33, 50

[56] References Cited

U.S. PATENT DOCUMENTS

| | | | |
|---|---|---|---|
| 5,274,617 | 12/1993 | Terashima et al. | 369/58 X |
| 5,365,502 | 11/1994 | Misono | 369/32 X |
| 5,410,526 | 4/1995 | Maeda et al. | 369/48 |
| 5,453,967 | 9/1995 | Aramaki et al. | 369/54 X |
| 5,487,047 | 1/1996 | Oka | 369/32 |

FOREIGN PATENT DOCUMENTS

| | | |
|---|---|---|
| 0402071A2 | 12/1990 | European Pat. Off. . |
| 0539966A2 | 5/1993 | European Pat. Off. . |
| 0551011A2 | 7/1993 | European Pat. Off. . |

OTHER PUBLICATIONS

U.S. Ser. No. 08/050,536 Jan. 23, 1996 N. Oka.

*Primary Examiner*—Nabil Hindi
*Assistant Examiner*—P. W. Huber
*Attorney, Agent, or Firm*—Limbach & Limbach L.L.P.

[57] ABSTRACT

A recording apparatus is provided for recording data in a recording region of a recording medium and information representing contents of said data recorded in the recording medium. The apparatus includes: a recording system for recording the data and information in the recording medium; a non-volatile memory for storing the contents of the data recorded in the recording medium; and a controller for renewing the information and storing it in the non-volatile memory at a certain time interval, to thereby facilitate a backup system and to suppress cancellation of the recorded data even upon a power suspension.

7 Claims, 8 Drawing Sheets

FIG.2

| | 16bit | | 16bit | | |
|---|---|---|---|---|---|
| | MSB    LSB | MSB    LSB | MSB    LSB | MSB    LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | 00000000 | 00000010 | 3 |
| | 00000000 | 00000000 | 00000000 | 00000000 | 4 |
| | 00000000 | 00000000 | 00000000 | 00000000 | 5 |
| | "M" | "I" | "N" | "I" | 6 |
| | Disc type | Rec power | First TNO | Last TNO | 7 |
| | READ OUT START ADDRESS (ROA) | | | Used Sectors | 8 |
| | POWER CALIBRATION AREA START ADDRESS (PCA) | | | 00000000 | 9 |
| | U-TOC START ADDRESS (USTA) | | | 00000000 | 10 |
| | RECORDABLE USER AREA START ADDRESS (RSTA) | | | 00000000 | 11 |
| CORRESPONDING TABLE INSTRUCTION DATA | 00000000 | P-TN01 | P-TN02 | P-TN03 | 12 |
| | P-TN04 | P-TN05 | P-TN06 | P-TN07 | 13 |
| | P-TN0248 | P-TN0249 | P-TN0250 | P-TN0251 | 74 |
| | P-TN0252 | P-TN0253 | P-TN0254 | P-TN0255 | 75 |
| | 00000000 | 00000000 | 00000000 | 00000000 | 76 |
| | 00000000 | 00000000 | 00000000 | 00000000 | 77 |
| SUPERVISORY TABLE (255 PARTS TABLE) (01h) | START ADDRESS | | | TRACK MODE | 78 |
| | END ADDRESS | | | 00000000 | 79 |
| (02h) | START ADDRESS | | | TRACK MODE | 80 |
| | END ADDRESS | | | 00000000 | 81 |
| (03h) | START ADDRESS | | | TRACK MODE | 82 |
| | END ADDRESS | | | 00000000 | 83 |
| (FCh) | START ADDRESS | | | TRACK MODE | 580 |
| | END ADDRESS | | | 00000000 | 581 |
| (FDh) | START ADDRESS | | | TRACK MODE | 582 |
| | END ADDRESS | | | 00000000 | 583 |
| (FEh) | START ADDRESS | | | TRACK MODE | 584 |
| | END ADDRESS | | | 00000000 | 585 |
| (FFh) | START ADDRESS | | | TRACK MODE | 586 |
| | END ADDRESS | | | 00000000 | 587 |

P-TOC SECTOR 0

FIG. 3

| | 16bit | | 16bit | | |
|---|---|---|---|---|---|
| | MSB         LSB | MSB         LSB | MSB         LSB | MSB         LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | 00000000 | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disc Serial No | 10 |
| CORRESPONDING TABLE INSTRUCTION DATA | DISC | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| SUPERVISORY TABLE (255 PARTS TABLE) | (01h) START ADDRESS | | | TRACK MODE | 78 |
| | END ADDRESS | | | LINK INFORMATION | 79 |
| | (02h) START ADDRESS | | | TRACK MODE | 80 |
| | END ADDRESS | | | LINK INFORMATION | 81 |
| | (03h) START ADDRESS | | | TRACK MODE | 82 |
| | END ADDRESS | | | LINK INFORMATION | 83 |
| | (FCh) START ADDRESS | | | TRACK MODE | 580 |
| | END ADDRESS | | | LINK INFORMATION | 581 |
| | (FDh) START ADDRESS | | | TRACK MODE | 582 |
| | END ADDRESS | | | LINK INFORMATION | 583 |
| | (FEh) START ADDRESS | | | TRACK MODE | 584 |
| | END ADDRESS | | | LINK INFORMATION | 585 |
| | (FFh) START ADDRESS | | | TRACK MODE | 586 |
| | END ADDRESS | | | LINK INFORMATION | 587 |

U-TOC SECTOR 0

APPARATUS FOR RECORDING DATA AND STATICALLY STORING AND RECORDING SUPERVISORY INFORMATION REPRESENTING CONTENTS OF THE DATA ON A RECORDING MEDIUM

BACKGROUND OF THE INVENTION

The present invention relates to an apparatus for recording data on a recording medium such as a disc or a tape.

Recording mediums such as optical discs, magneto-optical discs or magnetic tapes on which audio signals are recorded as digital signals are widely used as recording mediums in which, for example, a piece of music, a sound or the like may be recorded or reproduced. A recording and/or reproducing apparatus has been developed for the above medium.

In particular, recently, a medium has become available (i.e., so-called mini disc) not only for reproducing a signal but also recording a piece of music or the like by a user which is known as a magneto-optical disc. In the case of a mini disc system, an audio signal reproduced from the disc is once stored in a buffer, and the stored signal is read out for playback output. It is a so-called shock proof function. Of course, such a technique may also be applied to a production only system such as a compact disc system.

In such a digital recording/playback system, a table of contents (TOC) is recorded as supervisory information on the recording medium for controlling a recording operation and/or a playback operation of the data. The TOC information is read out from the recording medium, such as a disc, in advance and is held on the side of the recording/playback apparatus so that upon the operation, the TOC information may be referenced and the various controls of the access position and the music may be executed.

As described in, for example co-pending application Ser. No. 08/196,469, filed by the same applicant, TOC information is provided in the case of a minidisc where a premastered TOC (P-TOC) is recorded in the form of pits as non-overwritable information and a user TOC (U-TOC) is magneto-optically recorded so as to be rewritable in response to the recording/erasing operation for the music or the like. With respect to the U-TOC, as described in co-pending application Ser. No. 08/050,536, filed by the same applicant, the data are modified in the memory in response to the recording/erasing operation, and the U-TOC area is rewritten on the disc at a predetermined timing in accordance with the modified data.

By the way, in general, a semiconductor memory integrated circuit (IC) is used as a data buffer or a recording means for holding the TOC information. Thus, the storage section used as the data buffer for realizing the so-called shock proof function requires a large capacity (about 1 to 4 Mbits). Accordingly, a dynamic RAM (hereinafter referred to as D-RAM) is usually used, which has a high degree of integration in comparison with a static RAM (hereinafter referred to as S-RAM). As described in U.S. Pat. No. 5,410,526 issued to Mukawa, since a relatively small capacity (for example, about 256 Kbits) is sufficient for holding the TOC information, a part of the RAM for the data buffer is allotted for the TOC information.

As is well known, the structure for a backup means in case of a voltage drop of the main power source for the D-RAM is complicated in comparison with the structure for the S-RAM. Also, the consumption of power would be increased for the D-RAM. Therefore, it would be difficult to take a sufficient countermeasure against an accidental power suspension.

Now, in the case where the D-RAM is used only for the data buffer of the recording/playback apparatus, such a problem is not so serious. However, in the case where the D-RAM has a function of the TOC information, if the TOC information is erased by the accidental power stop, there are many problems. For instance, if the U-TOC information were to be erased mid-way through the compiling work during the recording operation, it would be impossible to record suitable supervisory information on the disc. In the case where the supervisory information would not be renewed on the disc, none of the data recorded by the recording operation that far would be recorded, resulting in serious problems.

It is therefore necessary to provide a backup means for the D-RAM so that, in case of an accidental voltage drop and power suspension, at least the U-TOC information that has been renewed is not volatile for a certain period of time. Further, the U-TOC information may be written on the disc to thereby suppress the losing of the recording data as much as possible. However, because the memory is the D-RAM, the backup structure is complicated and the cost is increased as described above. In particular, it is difficult to realize compact and inexpensive equipment.

Furthermore, during the recording operation in the D-RAM, the U-TOC data are not actually periodically renewed at a timing in response to the data recording. As described in U.S. Pat. No. 5,453,767 issued to Mukawa, the supervisory information is renewed in the D-RAM in accordance with the data that has been recorded so far, and after the suspension, the U-TOC data that has been renewed is read out from the D-RAM and written on the disc. Thus, in the case of an accidental suspension of the power supply during the recording operation, even if the data of the D-RAM were to be held, the U-TOC data written thereon would be kept under the non-renewal condition. Otherwise, in the case where a temporary suspension occurs in the mid-way, under the renewal condition, a partial renewal happens corresponding to the data that has been recorded up to the temporary suspension. Accordingly, it is meaningless to backup the D-RAM.

SUMMARY OF THE INVENTION

An object of the present invention is to provide an easy backup structure for a part or all of the data of supervisory information, and to suppress the losing of the recording data to a minimum level.

According to the present invention, there is provided a magneto-optical recording apparatus for recording both data in a recording region of a magneto-optical recording medium and information representing contents of the data recorded in the recording medium, which comprises: a recording means for recording the data and information in the magneto-optical recording medium; a non-volatile memory for storing the contents of the data recorded in the magneto-optical recording medium; and a control means for renewing the information and storing it in the non-volatile memory at a certain time interval. The nonvolatile memory may be a static random access memory (S-RAM).

The control means may include means for confirming whether a recording of the renewed information to the recording medium has been implemented whenever a power is turned on so that the renewed information which has been stored in the memory can be recorded to the recording medium when the recording has not been implemented when the power is turned on.

The control means performs an operation for renewing the information and storing it in the non-volatile memory at a time when a track number of recording data changes.

The control means also performs an operation for renewing the information and storing it in the non-memory when a recording of serial data occurs at physically spaced locations on the recording medium.

The control means further performs an operation for renewing the information and storing it in the non-volatile memory whenever it stops the recording operation.

The apparatus may further include means for prohibiting an ejecting operation of the apparatus. The prohibiting means prevents the recording medium from being ejected during the recording operation of the apparatus until the apparatus terminates a writing operation of the renewed information stored in the memory to the recording medium.

The supervisory information is renewed and held in a memory section as a static RAM and a memory section as a non-volatile memory, whereby it is easy to take the backup structure.

The non-volatile memory may be an Electrically Erasable Programmable-ROM (EEP-ROM), or Flash Electrically Erasable Programmable-ROM (so-called flash memory)), or an UV Erasable Programmable-ROM (EP-ROM), or a Non-Volatile-RAM (NV-RAM). Also, if the supervisory information concerning at least the addresses is renewed, it is possible to avoid losing all of the data up to those renewed addresses. Then, if a small amount of information such as information concerning the address only is to be backed up, it is easy to renew the data in the memory section while substantially following the recording operation.

Then, if the renewal operation is performed for every desired time interval (for example, one second or less) in the recording operation, and the supervisory information (at least address information) is renewed in response to the track change, parts change (in the case where the recording locations are physically spaced on the disc), or the like, the data may be held in the memory section even during the power suspension to thereby suppress the losing of the recorded data to a minimum level.

BRIEF DESCRIPTION OF THE DRAWINGS

In the accompanying drawings:

FIG. 2 is an illustration of a data structure of the P-TOC sector-0 to be read into the recording/playback apparatus according to an embodiment of the present invention;

FIG. 3 is an illustration of a data structure of the U-TOC sector-0 to be read into the recording/playback apparatus according to an embodiment of the present invention;

DESCRIPTION OF THE PREFERRED EMBODIMENTS

A mini disc recording playback apparatus will be explained in the following order on the basis of a recording apparatus according to an embodiment of the present invention with reference to FIGS. 1 to 8.

1. Structure of a recording playback apparatus
2. P-TOC sector
3. U-TOC sector
4. Structure of a buffer RAM
5. Renewal operation of U-TOC data upon recording
6. Operation on power-on
7. Various modifications.

1. Structure of a Recording Playback Apparatus

Figure 1:
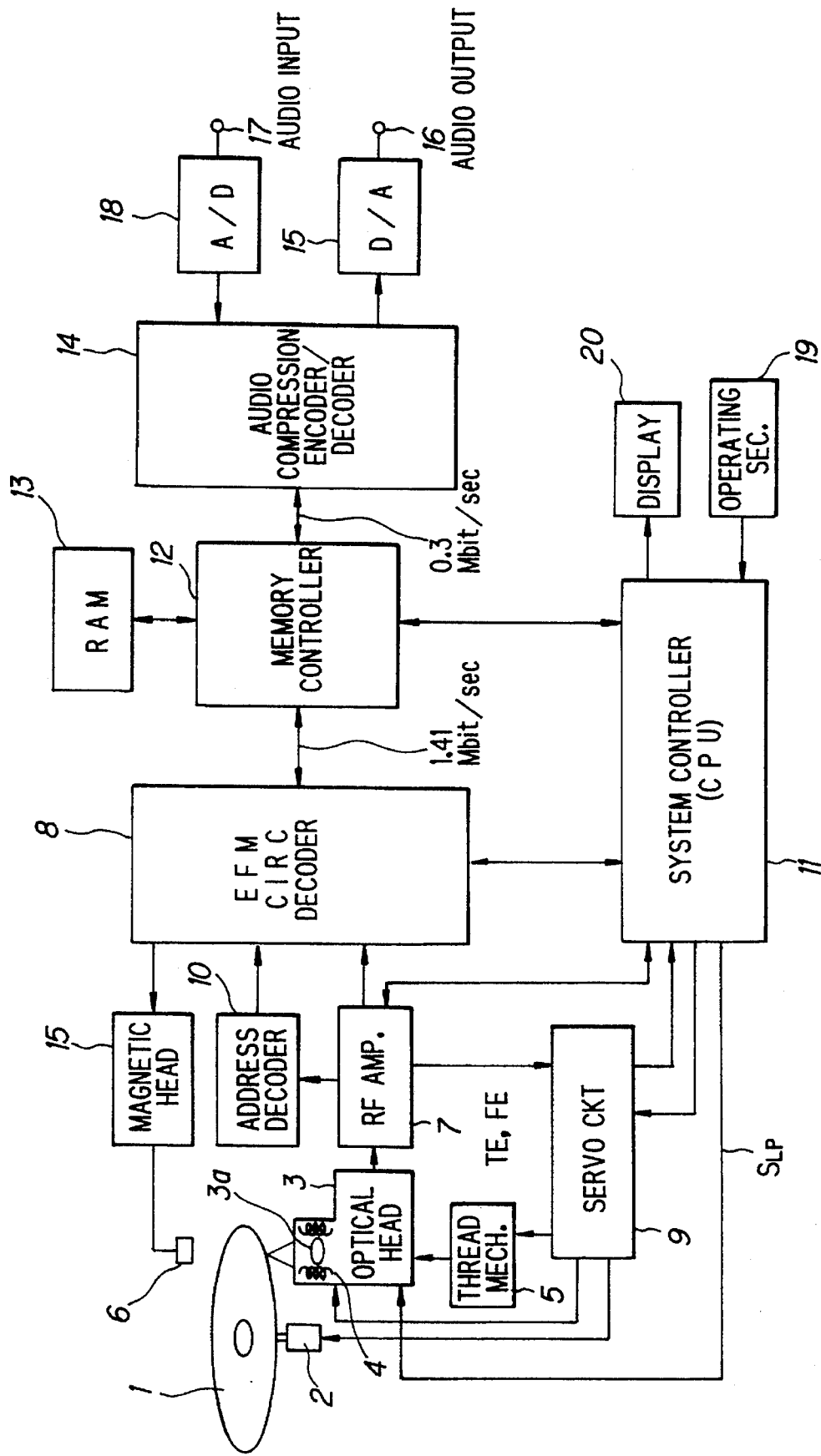
FIG. 1 is a block diagram showing a recording/playback apparatus in accordance with an embodiment of the present invention.

FIG. 1 is a block diagram showing a primary part of a recording/playback apparatus in accordance with an embodiment of the present invention.

A plurality of pieces of music (audio data), for example, are recorded on a disc 1 (a magneto-optical disc or an optical disc). The discs corresponding to a mini disc system include premastered type discs (write once optical discs) in which the music or the like is recorded in the form of pit data in advance, overwritable type discs (magneto-optical discs) on which the music data or the like may be recorded by the user, hybrid type discs which have pit areas where the music or the like is recorded in advance, and magneto-optical areas where recording is possible.

The disc 1 is loaded so as to be driven for rotation by a spindle motor 2 within a recording/playback apparatus 30. An optical head 3 irradiates a laser beam onto the disc 1 upon recording/playback operation. The optical head 3 generates a high level laser beam to the optical disc for heating a recording track up to a Curie temperature upon the recording operation. It also generates a low level laser beam to the optical disc for detecting the data through reflected beam by the magnetic Kerr effect upon the playback operation.

In the case where the disc 1 is an optical disc where the data is recorded in the form of pits, like a compact disc (CD), the optical head 3 picks up a playback radio frequency (RF) signal in response to the change of the reflected beam level by the existence of the pits in the same way as in the CD player without utilizing the magnetic Kerr effect. Of course, the magnetic recording operation as described later is not carried out on the optical disc.

In order to perform the data readout operation from the disc 1, the optical head 3 includes, as a laser output means, an optical system composed of a laser diode, a deflection beam splitter, an objective lens and the like, and a detector for detecting the reflected beam. The objective lens 3a is held to be displaceable in a radial direction of the disc and in a direction close to and away from the disc by a bidirection mechanism 4. Also, the optical head 3 as a whole is moveable in the radial direction of the disc by a thread mechanism 5. A magnetic head 6 applies a magnetic field, that has been modulated by the supplied data, to the magneto-optical disc. The magnetic head 6 is disposed at a position facing the optical head 3 through the disc 1.

The information detected from the disc 1 by the optical head 3 upon the playback operation is fed to an RF amplifier 7. Through an arithmetic operation of the fed information, the RF amplifier 7 extracts a playback RF signal, a tracking error signal, a focus error signal, an absolute position information signal (which represents an absolute position information recorded as a pregoove i,e., wobbling groove), an address information, a sub-code information signal, a focus monitoring signal, and the like. The extracted playback RF signal is fed to an encoder/decoder section 8. The tracking error signal and the focus error signal are supplied to a servo circuit 9.

Furthermore, the focus monitoring signal is supplied to a system controller 11 which is composed of, for example, a microcomputer.

The servo circuit 9 generates a variety of signals for driving a servo in response to a track jump command, a seek command, information detected as a rotary speed or the like from the system controller 11, and the tracking error signal and the focus error signal. The servo circuit 9 controls the bidirection mechanism 4 and the thread mechanism 5 to perform the focusing and tracking control, and also controls the spindle motor 2 to rotate at a constant angular velocity (CAV) or a constant linear velocity (CLV).

The playback RF signal is provided with an Eight to Fourteen Modulation (EFM) and a decoding process such as Cross Interleave Reed-Solomon Code (CIRC) in the encoder/decoder section 8 and is written once in a buffer RAM 13 by a memory controller 12. The readout operation of the data from the optical disc 1 by the optical head 3 and the transfer of the playback data from the optical head 3 to the buffer RAM 13 are intermittently performed at 1.41 Mbit/sec.

The data written in the buffer RAM 13 is read out at a timing when the playback data transfer is 0.3 Mbit/sec and is fed to the encoder/decoder section 14. Then, a playback signal process such as decoding process is applied against the video compression process. An analog signal is obtained by a D/A converter 15 and supplied to a predetermined amplifying circuit part from a terminal 16 to generate the playback output. For example, the signals are outputted as L and R audio signals.

For example, the buffer RAM has a memory capacity of 4 MB so as to temporarily store the playback data and to function as a shock proof memory for reading out the data. Where the memory capacity is 4 MB, for example, if the allowable data is fully stored, audio data corresponding to about 10 seconds is stored therein. For this period, even if the readout of the data by the optical head 3 has not been performed, it is possible to output the playback audio signal. Accordingly, even if the tracking of the optical head is displaced or largely jumped not to read out the data due to some external turbulence, there is no interruption of the audio output, so far as the optical head accesses the original position and restarts the data readout from the disc 1 during the period when the data output is performed from the buffer RAM 13.

The absolute position information obtained by decoding the pregroove information, or the address information recorded as the data, as an output from the address decoder 10 is supplied to the system controller 11 through the encoder/decoder section 8 for the various control operations.

Further, a lock detection signal of a phase locked loop (PLL) circuit for generating bit clocks of the recording/playback operation, and a monitoring signal of the playback data (L and R channels) without a frame synch signal are also supplied to the system controller 11.

When the recording operation is implemented to the disc 1 (magneto-optical disc), the recording signal (analog audio signal) fed to the terminal 17 is converted into digital data by the A/D converter 18, and thereafter is fed to the encoder/decoder section 14 to provide an encoding process for compressing the audio signal. The recorded data compressed by the encoder/decoder section 14 is temporarily written in the buffer RAM 13 by the memory controller 12 and is read out therefrom at a predetermined timing to be provided to the encoder/decoder section 8. The data is provided with the encoding process such as CIRC encoding and EFM modulation in the encoder/decoder section 8 and then supplied to a magnetic head drive circuit 15. The magnetic head drive circuit 15 feeds a magnetic head drive signal to the magnetic head 6 in response to the recorded data provided with the encoding process. Namely, the application of magnetic field N or S is executed to the magneto-optical disc 1 by the magnetic head 6. Also, at this time, the system controller 11 feeds a control signal to output a laser beam of recording level.

An entry portion 19 is provided with keys to be operated by the user. A display section 20 is composed of, for example, an LCD display as described above. In the entry portion 19, there are provided, for example, an audio recording key, a playback key, a pause key, a stop key, an AMS/search key, an eject key and the like for the user.

The above-described buffer RAM 13 is also used as a RAM for holding the TOC information in the magneto-optical disc 1. There are the premastered type, overwritable type and hybrid type discs corresponding to the recording/playback apparatus in accordance with the foregoing embodiment as described above. Depending on the type of disc, the data is recorded on the disc as TOC information for controlling both an area where the data such as music has already been recorded and a non-recorded area.

Then, when the disc 1 is loaded, or immediately before the recording/playback operation or the like, the system controller 11 drives the spindle motor 2 and the optical head 3 and extracts the data out of the TOC region formed on, for example, an innermost area of the disc 1. The TOC information that has been fed to the memory controller 12 through the RF amplifier 7 and the encoder/decoder section 8 is stored in the buffer RAM 13, and thereafter used for controlling the recording/playback operation of the disc 1.

For instance, when some music is desired to be recorded, the non-recorded area on the disc is searched from the U-TOC which is a part of the TOC information (TOC information region that may be overwritten in response to the recording, erasing and the like of the audio signal), and the audio data may be recorded on the non-recorded area. Upon playback, the area where the desired music is recorded is recognized from the TOC information, and the area is accessed for playback.

Furthermore, when the music or the like is recorded on the disc 1, the U-TOC is renewed within the buffer RAM 13 in response to the recording operation, and the U-TOC data which has been renewed upon the completion of the recording is read out from the RAM 13 and written in the disc 1. By renewing the U-TOC in the disc 1 in this way, it is possible to playback the recorded music or the like.

By the way, when the user performs the eject operation under the condition that the disc is loaded, the system controller 11 controls the loading/unloading mechanism (not shown) so as to eject the disc from the recording/playback apparatus. However, in the foregoing embodiment, the system controller 11 does not accept the eject operation from the time starting the recording operation until the recording and the operation of writing the renewed U-TOC on the disc is completed.

Such an eject forbidding means is disclosed in, for example, Ser. No. 07/806,930 filed by the present applicant and may be used in the embodiment.

2. P-TOC Sector

The structure of the P-TOC out of the TOC information is shown in FIG. 2. FIG. 2 shows a data region (hereinafter referred to as "P-TOC sector 0") where the information is to be recorded to an area supervision on the disc or an address concerning a piece of music or the like (ROM information) previously recorded in the disc. Although only the sector 0 will be explained as the P-TOC format in the following description, the sector-1 and the following sectors are set in the area where, for example, character information or the like is recorded and are used when they are required.

Each data region (sector) of the TOC is formed into a data region of, for example, 4 bytes×588 provided with a header having synchronizing patterns and addresses composed of all 0 or all 1 at a leading position for representing the TOC region.

In the P-TOC sector-0 shown in FIG. 2, subsequently to the header, in predetermined address positions, there are provided a disc type, a recording level, a first piece of music (First TNO) recorded, a last piece of music (Last TNO) recorded, a readout start address (ROA), a power calibration area start address (PCA), a start address of the U-TOC (USTA) (data region of U-TOC sector-0 shown in FIG. 3), a start address of the recordable user area (RSTA) and the like. Subsequently, a corresponding table instruction data section is prepared, having table pointers (P-TNO1 to P-TNO255) by which each piece of the recorded music is arranged to correspond to parts tables in the supervisory table section described later.

In the region subsequent to the corresponding table instruction data section, the supervisory table section is provided having 255 parts tables from (01 h) to (FFh) corresponding to the table pointers (P-TNO1 to P-TNO255) in the corresponding table instruction data section. The reference numeral to which "h" is attached represents so-called hexadecimal notation.

In each parts table, a start address, an end address, and mode information of the parts (track) may be recorded with respect to certain parts. The parts, in this embodiment, means a track part where data are physically and continuously recorded on the track of the disc.

In the mode information of the track of each parts table, information is recorded as to whether or not the parts are set for the overwrite forbidding, the data copy forbidding, for example, as to whether the data are audio information, or information discriminating monaural/stereo signals. The content of each parts table from (01 h) to (FFh) in the supervisory table section is indicated by the table pointers (P-TNO1 to P-TNO255) of the corresponding table instruction data section. Namely, with respect to the first piece of music, a certain parts table is recorded (for example, as (01 h) however, actually the table pointer represents the parts table by means of a numeral value representing a byte position within the P-TOC sector-0 through a predetermined arithmetic process). In this case, the start address of the parts table (01 h) shows an address of the position where the first music recording starts, and in the same manner, the end address shows an address of the position where the first music recording is ended. Furthermore, the track mode is the information of the first music.

In the same manner, with respect to the second music, the start address, the end address and the track mode information as to the recorded position of the second music are recorded in the parts table (for example, (02 h)) shown in the table pointer P-TNO2.

In the same way, the table pointers are provided for P-TNO255, and hence it is possible to control 255 pieces of music on the P-TOC.

By means of thus forming the P-TOC sector-0, it is possible to access and reproduce a predetermined piece of music on, for example, the playback operation.

3. U-TOC Sector

FIG. 3 shows a data region (hereinafter referred to as "U-TOC sector-0") where information is to be recorded such as addresses or the like concerning the newly recordable non-recorded area or the recordable area on which a piece of music has been already recorded mainly by the user.

Only the sector-0 will be explained as to the U-TOC format. However the sector-1 and the other sectors are set in the same way as the regions for recording the character information or the like, and are used as desired. In the premastered disc, though, there is no U-TOC.

Data such as a maker code, a model code, a first piece of music (First TNO), a last piece of music (Last TNO), a used condition of the sector, a disc serial number, a disc ID and the like are recorded at predetermined address positions subsequent to the header in the data region shown in FIG. 3, i.e., the U-TOC sector-0. Furthermore, in order to identify the non-recorded region or the music area where the music is previously recorded by the user, having them correspond to the supervisory table portion as described later, an area as the corresponding table instruction data section is provided for recording various kinds of table pointers (P-DFA, P-EMPTY, P-FRA, P-TNO1~P-TNO255).

Then, 255 parts tables from (01 h) to (FFh) are provided as supervisory table sections corresponding to the table pointers (P-DFA-to P-TNO255) of the corresponding table instruction data section. In the same way as in the P-TOC sector-1 shown in FIG. 2, a start address with respect to certain parts, an end address thereof, and mode information of the parts are recorded. Furthermore, in case of the U-TOC sector-0, since there are some cases where the parts of each parts table are connected continuously with the other parts, the link information can be recorded representing the parts table in which the start address and the end address of the parts to be connected are recorded.

In case of the mini disc, for example, even if the recording data of a single piece of music is physically discontinued, that is, the single piece of music is recorded over a plurality of the parts, the playback could be continued by accessing from parts to parts so that there are no problems in playback operation. Accordingly, in the case where the user records the music or the like, there are some cases where the music or the like is separately recorded over the plurality of parts for the purpose of effectively using the recordable area. For this reason, there is provided the link information. The parts tables to be connected can be coupled with each other by indicating the parts table in accordance with the numbers (01 h) to (FFh) (which is actually indicated by the byte position within the U-TOC sector-0) given to the respective parts tables, for example. With respect to the music or the like which has been recorded in advance, in general, it is unnecessary to separate the music over the parts, and hence, all the link information is given as "(00 h)" in the P-TOC sector-0 as shown in FIG. 2.

Namely, in the supervisory table section in the U-TOC sector-0, a single parts table represents single parts. With respect to the music which is composed of three coupled parts, for example, the parts positions are controlled by the three parts tables coupled by the link information.

The contents of the parts of each parts table in the supervisory table section of the U-TOC sector-0 from (01 h) to (FFh) are represented by the table pointers (P-DFA, P-EMPTY, P-FRA, P-TNO1 to P-TNO255) in the corresponding table instruction data section as follows.

The table pointer P-DFA represents the defect area on the magneto-optical disc 1, and indicates a single parts table or a leading parts table within a plurality of parts tables, where a track portion (i.e., parts) becomes a defect area due to damage. Namely, in the case where the defect parts are present, any one of (01 h) to (FFh) is recorded in the table pointer P-DFA. In the parts table corresponding to this, the defect parts are indicated by the start and end addresses. Also, in the case where any other defect parts are present, the other parts table is designated as the link information in the parts table, representing the defect parts in the parts table.

Furthermore, in the case where no other defect parts are present, the link information is, for example, "(00 h)" and this represents that any further link is not present. The table pointer P-EMPTY shows the single non-used parts table or the leading parts table of a plurality of non-used parts tables. In the case where the non-used parts table is present, any one of (01 h) to (FFh) is recorded as the table pointer P-EMPTY. In the case where the plurality of non-used parts tables are present, the parts tables are designated in order by the link information from the parts tables designated by the table pointer P-EMPTY. All the non-used parts tables are coupled together on the supervisory table section.

The table pointer P-FRA shows a data recordable non-recorded area of the data on the magneto-optical disc 1 (including the erased area). It designates the single parts table which has a track portion (i.e., parts) as the non-recorded area and the leading parts table of the plurality of parts tables having the track portions as the non-recorded area. Namely, in the case where the non-recorded area is present, any one of (01 h) to (FFh) is recorded in the table pointer P-FRA, and in the parts table corresponding to this, the parts as the non-recorded area are indicated by the start and end addresses. Also, in the case where a plurality of such parts are present, i.e., a plurality of parts tables are present, the parts tables are indicated in order by the link information until the link information becomes "(00 h)".

Figure 4:
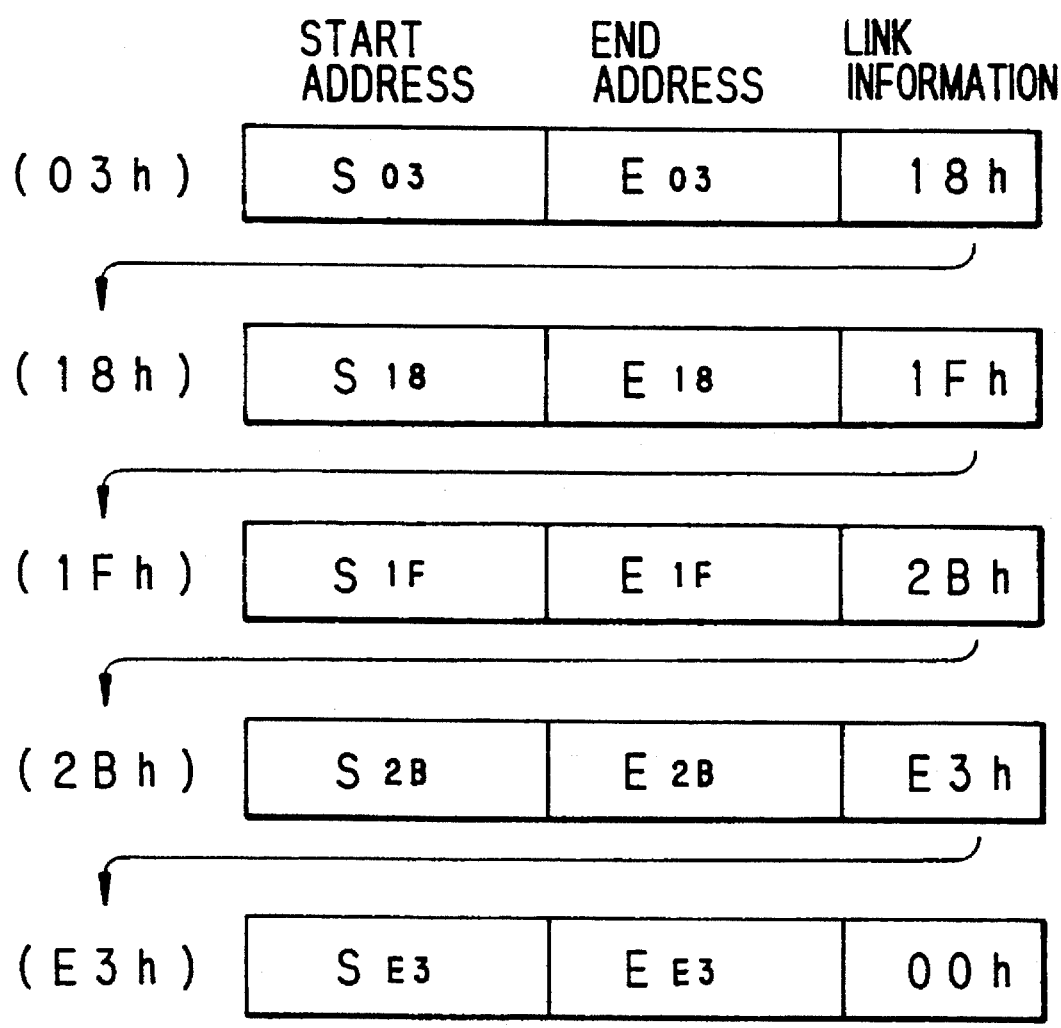
FIG. 4 is an illustration of a link structure of the data of the U-TOC sectors to be read into the recording/playback apparatus according to an embodiment of the present invention.

The supervised condition of the parts in the non-recorded area is schematically shown in FIG. 4 in accordance with the parts table. This shows the condition represented by the links of the parts tables (03 h), (18 h), (1 Fh), (2 Bh) and (E3 h) subsequent to the corresponding table instruction data P-FRA, when the parts (03 h), (18 h), (1 Fh), (2 Bh) and (E3 h) are non-recorded area. The way of supervising becomes similar for the above-described defect areas and non-used parts tables.

By the way, if any pieces of music or audio data are not recorded and there is no defect in the magneto-optical disc at all, the parts table (01 h) is designated by the table pointer P-FRA, indicating that all the recordable user area of the disc is non-recorded area (free area). In this case, since the rest of the parts tables of (02 h) to (FFh) are not used, the parts table (02 h) is designated by the above-described table pointer P-EMPTY. The parts table (03 h) is designated as the link information of the parts table (02 h). The parts table (04 h) is designated as the link information of the parts table (03 h), and thus the parts tables are coupled in order up to the parts table (FFh). In this case, the link information of the parts table (FFh) is "(00 h)" that shows no further linkage.

With respect to the parts table (01 h), the start address of the recordable user area is recorded as the start address and the address immediately before the readout start address is recorded as the end address.

The table pointers P-TNO1 to P-TNO255 show the pieces of music which have been recorded by the user on the magneto-optical disc 1. For example, in the table pointer P-TNO1, the parts table is designated by the first leading parts out of the single or plural parts in which the data of the first piece of music has been recorded.

For example, in the case where the first piece of music is recorded without any track separation (i.e., with single parts), the recording area of the first music is recorded as the start and end addresses of the parts table indicated by the table pointer P-TNO1.

Also, for example, in the case where a second piece of music is separately recorded in the plurality of parts on the disc, respective parts are designated in accordance with a time order so as to indicate the recording position of the music. Namely, the parts table indicated by the table pointer P-TNO2 and the other parts table indicated by the link information are designated in the time order basis so that the parts tables are linked in the same condition shown in FIG. 4 up to the parts table where the link information is "(00 h)". Since all the parts where the data relating to the second music, for example, are designated in order and recorded, by using the data of the U-TOC sector-0, it is possible to extract the continuous music information from the separate parts and to perform the recording by effectively using the recording area, while accessing the optical head 3 and the magnetic head 6 in reproducing the second music or overwriting the data on the second music area.

Since it is unnecessary to rewrite the data for the P-TOC sector, the latter is recorded as ROM data in the disc. On the other hand, since it is necessary to rewrite the data whenever the user performs the recording, erasing or the like, the U-TOC sector is recorded as the magneto-optical information in the disc.

In the recording/playback apparatus in accordance with the foregoing embodiment for the magneto-optical disc 1 (or optical disc) where the TOC information is recorded, the recording/playback operation is controlled by supervising the recording area of the disc by the TOC information read in the buffer RAM 13, the U-TOC data are renewed within the buffer RAM 13 upon the recording operation as described above, and the U-TOC data are renewed on the disc after the completion of the recording operation.

4. Structure of Buffer RAM

According to an embodiment of the present invention, a storage element section in the form of a D-RAM and a storage element section in the form of an S-RAM are provided in the buffer RAM 13.

Figure 5:
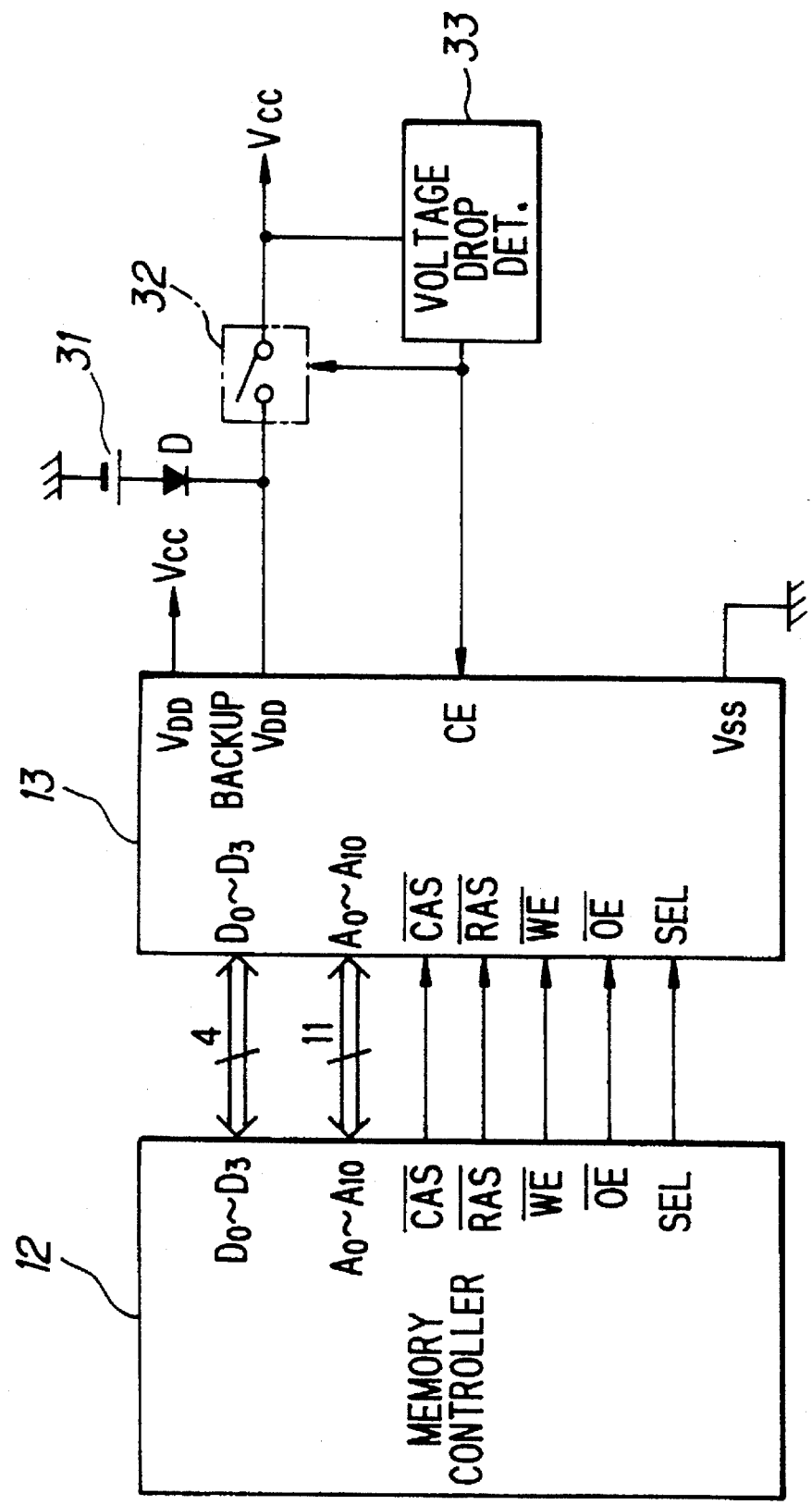
FIG. 5 is a view Showing a structure of a memory controller and a buffer RAM according to an embodiment of the present invention.

FIG. 5 shows the memory controller 12 and the buffer RAM 13 of the block diagram shown in FIG. 1.

For instance, a 4-bit data bus (ports D0 to D3) and an 11-bit address bus (ports A0 to A10) are connected between the main controller 12 and the buffer RAM 13. At the same time, Column Address Select (CAS) ports, Row Address Select (RAS) ports, Write Enable (WE) ports, Output Enable (OE) ports, and D-RAM/S-RAM Select Signal Ports (SEL ports) are connected thereto, respectively.

A battery 31 is provided as a backup power source and is connected to a backup power source port through a diode D. A voltage drop detector 33 is provided for a main power source Vcc line, and an output of the voltage drop detector 33 controls a switch 32 and a Chip Enable (CE) port. Namely, these elements are used as a backup means for a regular S-RAM. When the voltage of the main power source Vcc line drops below a predetermined level, the voltage drop detector 33 causes the voltage level of the CE port to be "L" so that the memory backup can be performed by the voltage from the battery 32 as the backup power source. It is possible to incorporate the backup means in the memory chip.

Figure 6:
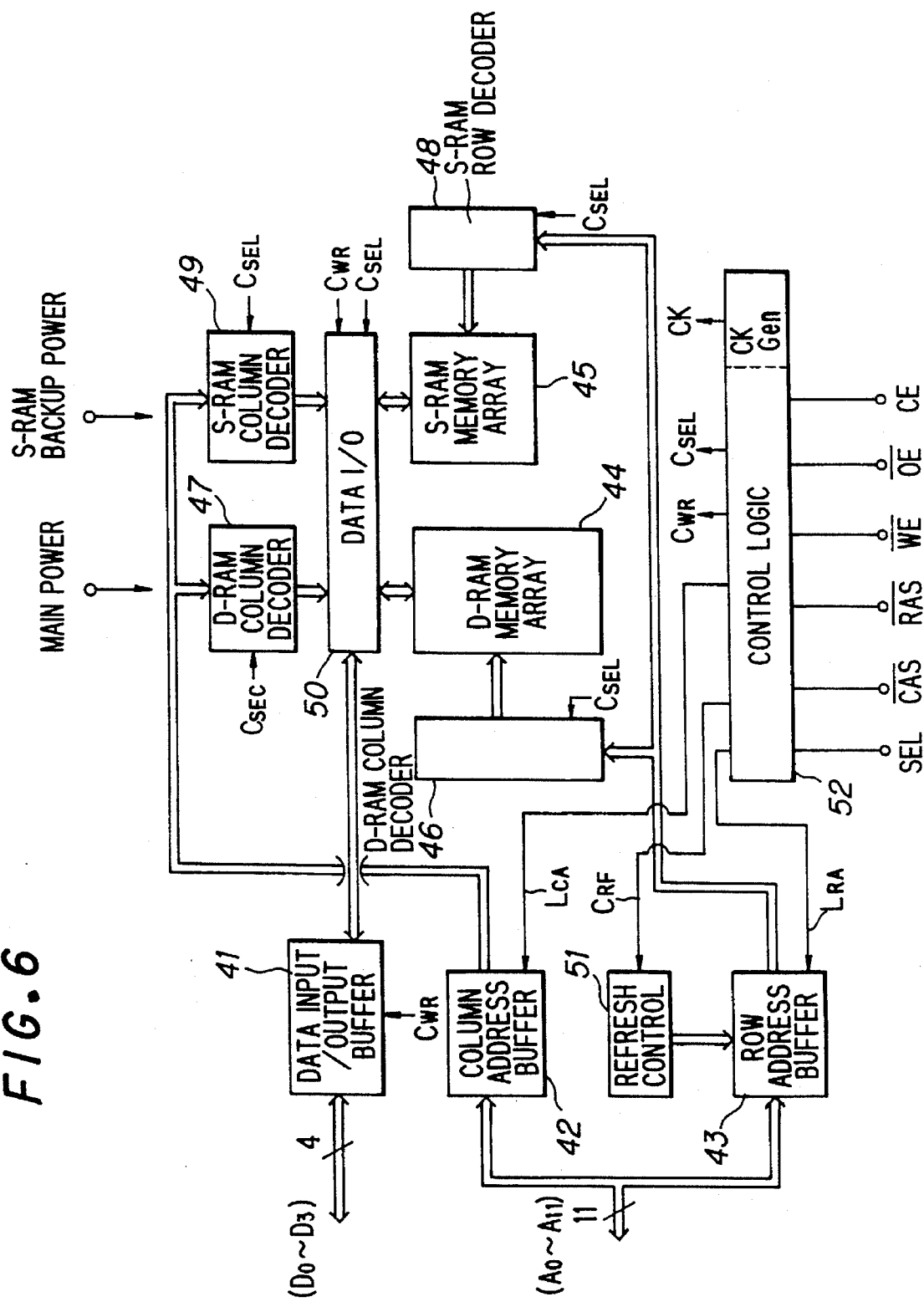
FIG. 6 is a view showing a structure of a buffer RAM according to an embodiment of the present invention.

An internal structure of the buffer RAM 13 is shown in FIG. 6. An input/output buffer 41 is provided for input/output of the ports D0 to D3. A row address buffer 42 is provided for latching the row addresses out of the address information supplied from A0 to A10, and a column address buffer 43 is provided for latching the column addresses out of the address information supplied from A0 to A10. The address data is so-called address multiplex data which is standard in the D-RAM. Namely, a system is used in which the row and column addresses are fed into a single address port in a time-sharing manner.

Also, a memory array where memory elements are formed in a matrix manner is provided with a D-RAM memory array 44 for holding a memory with a capacitance and a S-RAM memory 45 for holding a memory with a flip-flop operation. Since the D-RAM memory array 44 is used as a shock proof buffer, a relatively large capacity of, for example, 4 MB is required therefor. However, the S-RAM memory array 45 is used to hold the U-TOC data as described later, and a capacity required therefor is sufficient. One sector of the U-TOC is 2,352 bytes (18.816 Kbits). For example, if this is used only for holding the U-TOC sector-0 described above, it is sufficient to use a capacity of at least 18.816 Kbits. For this reason, the increased cost for mounting the S-RAM memory array 45 is not so large.

A column decoder 46 and a row decoder 47 are provided corresponding to the D-RAM memory array 44, and a column decoder 48 and a row decoder 49 are provided corresponding to the S-RAM memory array 45. A data interface 50 is provided for the writing/reading operation. Also, a refresh controller 51 is provided for performing the refresh operation over the D-RAM memory array 44.

A control logic 52 is provided for generating a control signal for controlling each part in response to the signals of the CAS port, RAS ports, WE ports, OE ports, OE ports, SEL ports, and CE port and a clock signal CK.

In the foregoing embodiment in which the buffer RAM 13 is thus formed, the recording/playback data is stored in the D-RAM memory array 44. On the other hand, all or part of the TOC information (at least U-TOC sector-0) is stored in the S-RAM memory array 45.

When the buffer RAM 13 operates, the select signal between the D-RAM memory array 44 and the S-RAM memory array 45 is fed from the memory controller 12 to the SEC port. For example, a most significant bit (MSB) of the reading/writing address may be used as the select signal. A mode control signal CSEL is output to each desired part based on the select signal.

Also, a control signal CWR is outputted to each desired part depending on the state of the WE ports, OE ports and CE port so as to thereby effect the control of the storing/reading modes.

Then, in the case where the recording/playback data are stored in the D-RAM memory array 44, the control logic 52 generates row and column address latch timing signals LCA and LRA for the row and column by using the CAS input and the RAS input, and feeds them to the row address buffer 42 and the column address buffer 43, respectively, to entrain the row address and the column address.

The input row address is fed to the row decoder 47, and the column address is fed to the column decoder. The input data held in the input/output buffer 41 is written in predetermined addresses within the D-RAM memory array 44 in response to the designation of the row decoder 46 and the column decoder 47 through the data interface section 50.

In the case where the data is read out from the D-RAM memory array 44, too, the row address and the column address inputted into the row address buffer 42 and the column address buffer 43 are fed to the row decoder 47 and the column decoder 46. The data of the designated addresses is picked up from the D-RAM memory array 44 and output to the memory controller 12 from the input/output buffer 41 through the data interface section 50.

In the refresh operation over the D-RAM memory array 44, the control logic 52 controls a refresh controller 51 so that the refresh column address is designated by using the CAS port input and RAS port input in a method, for example, so-called "CAS before RAS refresh."

On the other hand, the TOC data is stored in the S-RAM memory array 45, the row address and the column address are received in the row address buffer 42 and the column address buffer 43 on the basis of the address latch timing signals LCA and LRA, formed in the control logic 52, for the row and column S-RAM. Then the row address is fed to the row decoder 49, and the column address is fed to the column decoder 48. The input data held in the input/output buffer 41 is written in predetermined addresses within the S-RAM memory array 45 in response to designations by the row decoder 48 and the column decoder 49 through the data interface section 50.

In the case where the data is read from the D-RAM memory array 45, the row address and the column address received in the row address buffer 42 and the column address buffer 43 are fed into the row decoder 49 and the column decoder 48. The designated address is picked up from the S-RAM memory array 45 and outputted to the memory controller 12 from the input/output buffer 41 through the data interface 50.

Thus, in the foregoing embodiment, the buffer RAM 13 is provided with the D-RAM memory array 44 and the S-RAM memory array 45. In particular, the recording/playback data is stored in the D-RAM memory array 44, whereas part or all of the TOC information is stored in the S-RAM memory array 45. Then, the S-RAM memory array 45 is provided with the backup means of the battery 31. Accordingly, when the power source voltage drops, it is possible to avoid losing the TOC information. At the same time, since the memory is an S-RAM, it is easy to form the backup means. The power consumption for the backup is small. It is also possible to use a large capacitor instead of the battery.

In this case, the function of the data buffer which requires a relatively large capacity is imparted to the D-RAM memory array 44, whereby the memory element may be made compact and costs are reduced.

The parts of the S-RAM and the D-RAM are mixed into a monolithic structure (one-chip), whereby in the recording/playback apparatus on which the components are mounted, a substrate surface area may be small, and the wiring, controlling and the like may be simplified and facilitated. Namely, in the case when an S-RAM chip and a D-RAM chip are juxtaposed, the address buses, data buses and the control system signal lines have to be provided for each chip. However, the complication of the wiring and the complication of the control of the memory controller 12 due to the parallel control may be avoided.

In an embodiment of the present invention, by utilizing the buffer RAM having such a structure, the following operation is carried out on the recording and the power-off state, whereby even if an accidental power suspension is generated during, for example, recording, the losing of the recorded data may be suppressed to a minimum level. Actually, it is possible to almost completely reproduce the data recorded on the disc.

5. U-TOC Data Renewal Operation Upon Recording

Figure 7:
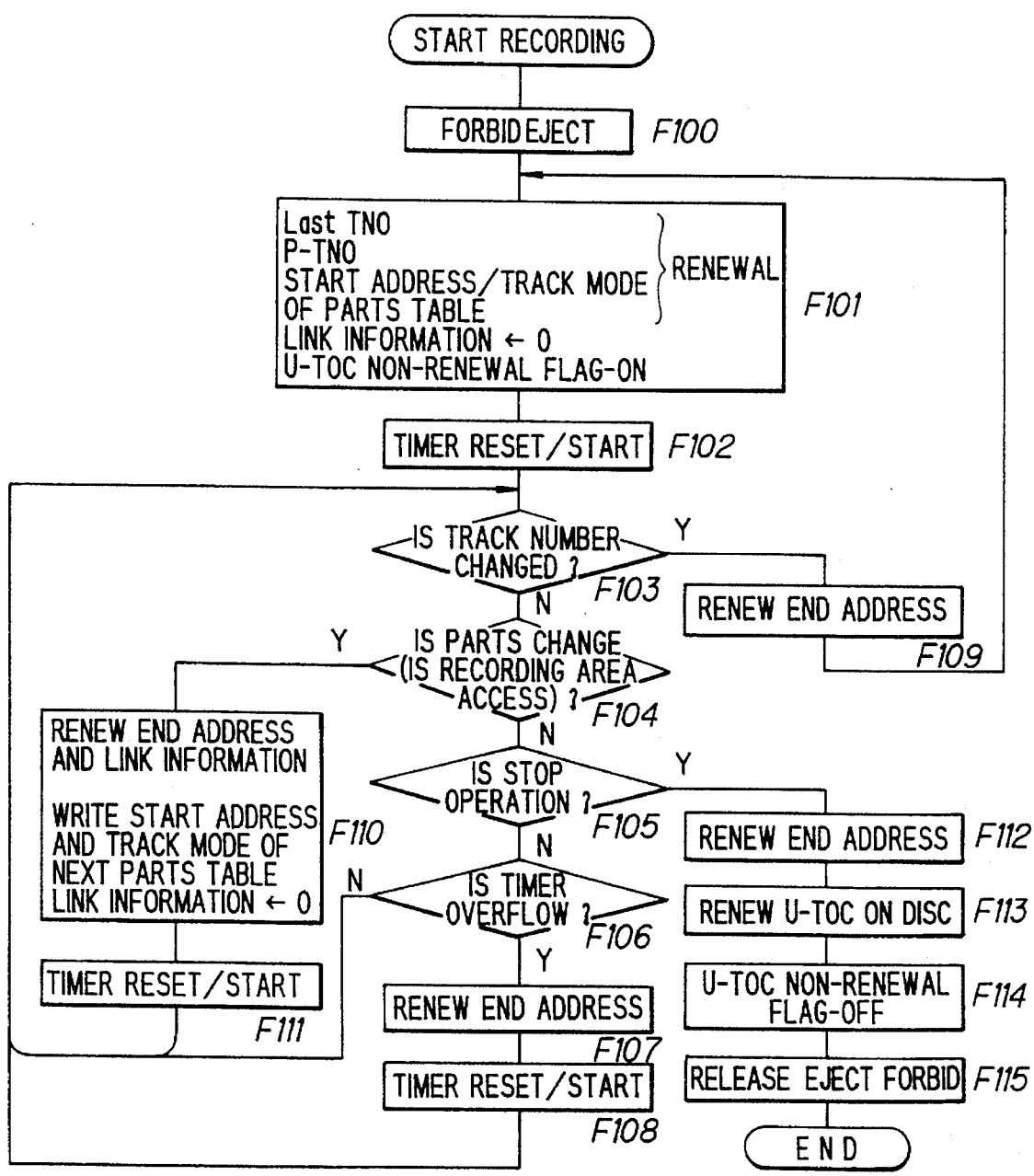
FIG. 7 is a flowchart showing a U-TOC data renewal operation in recording according to an embodiment of the present invention.

Upon recording, the system controller 11 performs the process shown in FIG. 7 as the renewal of the U-TOC data. When the audio signal which has been processed through a recording operation is fed into the system controller, the system controller 11 drives the optical head 3 and the magnetic head 6 over the disc 1 as described above and writes the audio data. When such audio recording operation is started, first of all, even if the user performs the eject operation, the system controller 11 accesses an eject forbidding mode so as not to accept the eject operation (F100). The eject forbidding may be realized by mechanically locking a cover for a disc eject portion in response to the operation of the recording key. In such a case, the step F100 (and F115) is not processed by the system controller 11.

Subsequently, a process of step F101 is performed on data of the U-TOC sector-0 held in the S-RAM memory array 45 in the buffer RAM 13. Namely, in response to the operation in which a new piece of music is recorded by the recording operation, the final track number is changed. Accordingly, the Last TNO is renewed as the last track number. In order to supervise the data of the track number (n), the table pointer P-TNOn, the track number and the start address are written at the parts table introduced from the table pointer P-TNOn. Also, at this time (i.e., the recording start), since the data to be recorded has not been divided into parts, the information of the parts table is changed to "00h".

Also, after that, upon recording, the U-TOC data is renewed on the buffer RAM 13 at a predetermined timing. However, since the renewed U-TOC data has not yet been actually written on the disc 1, a U-TOC non-renewal flag which shows this fact is turned on. Further, the U-TOC non-renewal flag information is also written in the S-RAM memory array 45.

Subsequently, a timer is reset in order to obtain a timing for renewal of the U-TOC data at every time interval, and the counter is started (F102). For example, if, during the recording operation, the renewal is performed every one second, the timer is set so that it counts up for one second.

Under this condition, it is respectively judged whether or not the track number has been changed with respect to the audio signal fed as the audio data (F103), whether or not the recording has been carried out in accessing a physically different position on the disc (whether or not the parts have been divided) (F104), whether or not the stop operation has been effected by the user (F105), and whether or not the timer has counted up (i.e., a lapse of one second) (F106).

Whenever one second has passed for the recording operation, the process is advanced to the step F107. At this time, the parts table is renewed by considering the address where the recording is being carried out as the end address. Then, the timer is reset/restarted (F108), and the process is returned back to the step F103.

In the case where the audio signal to be recorded is fed in as digital data from, for example, a compact disc player, since the track number information which has been changed for every piece of music is simultaneously supplied, the system controller 11 can detect the change of the track number from that information. Also, the system controller 11 judges that there is a change in track number in the audio data which is being recorded even though the audio signal is an analog signal, in the case where the user carries out the pause operation, or in the case where the track mark operation is carried out while the track mark operation function is added by the user to the recording/playback apparatus for designating an interval of the music/sound.

When the track number is changed, the data that has been recorded is considered as the data which completes a single piece of music, for example. The audio data which will subsequently be fed is related to the data of the next piece of music. Accordingly, the end address of the parts table is determined at that time while it is under renewal. Accordingly, the process is advanced from step F103 to F109 and the end address is written. Then the process is returned to step F101.

At the same time when the next music is started, the last track number is changed. Accordingly, the Last TNO is renewed as the last track number. Furthermore, in order to supervise the address of the data of the track number (n), the table pointer P-TNOn, the track number and the start address are written at the parts table introduced from the table pointer P-TNOn. Also, at this time (when the recorded data are shifted to the next music), since the data of the music is not divided into the parts, the link information of the parts table is changed to "00h".

Then, the time is reset/restarted so that the periodical end address renewal process of step F107 is again carried out one second after the renewal process (F102).

When the audio recording has been performed to the end address in the parts in some free area on the disc on which the recording is being carried out, another free area is accessed and thereafter the data will be recorded. Namely, the piece of music is recorded separately in the two or more parts. At this time, the process is advanced from step F104 to step F110.

In this case, since the end address is determined with respect to the parts in which the recording has been performed so far, the end address is written in the parts table which is under the renewal. Since the parts table is controlled to be linked with the other subsequent parts table, the link information is renewed to indicate the subsequent parts table.

Then, the start address and the track mode are written in the next linked parts table. Also, at this time, since the new parts table has not been linked to the next further parts table, the link information is changed to "00h".

The timer is reset and restarted so that the periodical end address renewal process is effected again one second after the renewal process (F111). The process is returned back to step F103.

In the case where the stop operation is carried out, the process is advanced from step F105 to step F112. The end address is renewed since it is confirmed at that time while renewing.

Since the renewal of the U-TOC data relating to the recording operation has been completed, the renewed U-TOC data is read out from the S-RAM memory array 45 in the buffer RAM 13, and is written in the disc 1 (F113). Also, the eject forbidding is released (F115) and the process upon the recording is completed. In this case, a suitable recording operation is completed without an accidental power source suspension or the like.

Assume that the power source plug is pulled out of the power source or the power source is suspended due to an electrical accident or the like at some time prior to the completion of the suitable recording operation from such a stop operation.

In this case, of course, the recording operation is interrupted, but the control information (address information) relating to the recorded data up to that time (at least the time one second prior to the suspension) is held in the S-RAM memory array 45 to prevent losing it.

At this time, since the renewed U-TOC data has not been written in the disc, it is considered to be a condition where the data has not yet been recorded on the disc. However, since the renewed U-TOC data has been held, by carrying out the process as shown in FIG. 8, when the power source is again turned on, it is possible to consider the audio data that has already been recorded up until at least the power suspension happened as those recorded without losing the supervisory information.

6. Operation Upon Power Source-On

Figure 8:
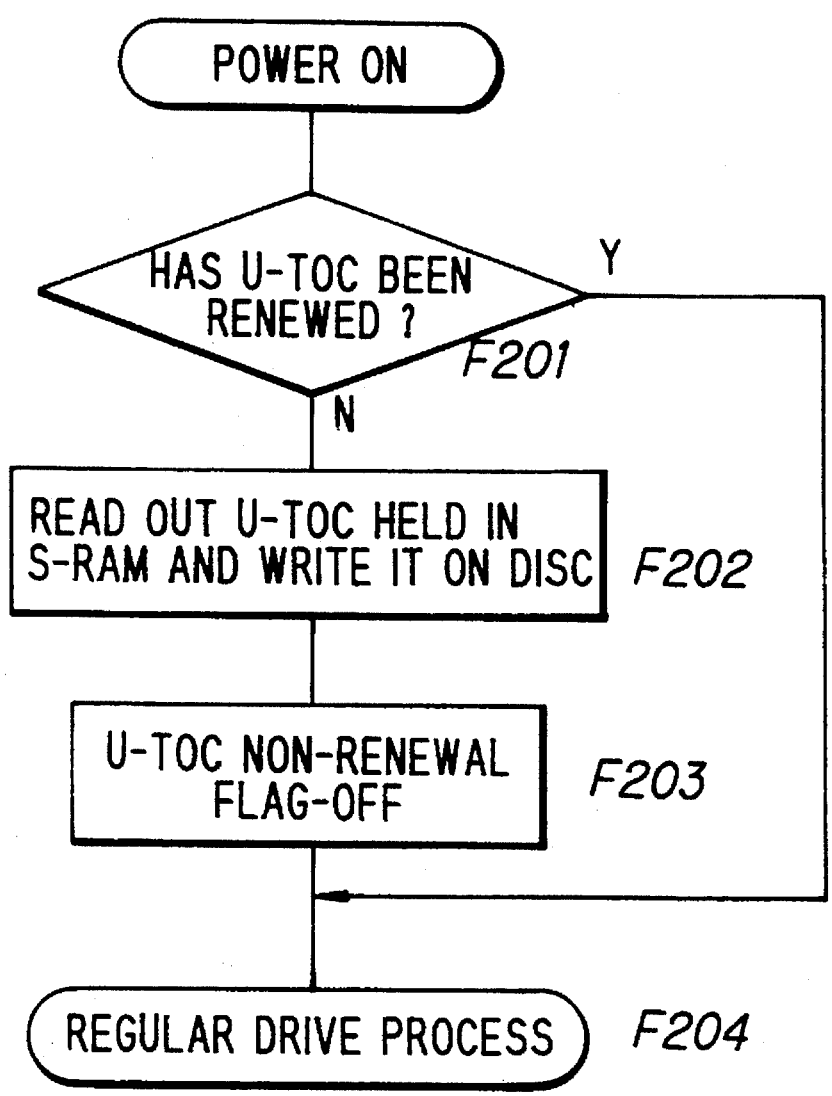
FIG. 8 is a flowchart showing a process when a power is turned on according to an embodiment of the present invention.

FIG. 8 shows a process of the system controller 11 when the power source is turned on. When the power source is turned on and the system controller 11 is driven, first of all, the system controller 11 confirms the data in the S-RAM memory array in the buffer RAM 13, and judges whether or not the U-TOC non-renewal flag is turned on (F201). If the U-TOC non-renewal flag is turned off, the power source is turned on as usual, and the process is shifted to the normal drive operation (F204).

If the U-TOC non-renewal flag is turned on, the process in step F114 is not carried out. It may be determined that the power suspension prior to this time was caused by an accidental problem in the recording operation.

Then, the process is advanced to step F202, and the U-TOC data held the S-RAM memory in the buffer RAM 13 is written in the disc 1. Then, the U-TOC non-renewal flag is turned off (F203), and the process is shifted to the normal process when the power is turned on (F204).

Thus, when the power suspension occurs in the recording operation, the supervisory information is written in the disc concerning the audio data that had been recorded immediately before the power suspension happened. Accordingly, the audio data recorded immediately before the power suspension is considered, and there is no risk of losing the data.

Since the eject is forbidden during the recording operation (of course, the eject is impossible until the power is again turned on after the power suspension), there is no risk that the discs would be exchanged without turning on the power source after the power suspension, and there is no risk that the U-TOC data held in the other disc will be written.

7. Various Modifications

In the foregoing embodiment, the periodic renewal of the U-TOC data is carried out for every one second but the renewal period of time may be set to less than one second, In particular, since the periodical data renewal is performed only by three bytes of the end address, a process time period may be very short. It may be efficient to shorten the period of time to less than one second. Needless to say, the shorter the renewal interval, the smaller the amount of data which could be lost.

Of course, it may also be set to an interval longer than one second. Moreover, in the foregoing embodiment, the U-TOC non-renewal flag is set for judging whether or not the U-TOC data has been renewed on the disc but this flag does not have to be used. For example, if the U-TOC is renewed on the disc, and thereafter the U-TOC data are cleared from the buffer RAM 13, it is possible to judge whether or not the renewal is effected on the disc by determining whether the U-TOC data remains upon the turning-on of the power.

Also, if the renewal of the U-TOC data is effected at least on the information to control the address as shown in FIG. 7, it is possible to avoid the losing of the recorded data. However, if the capacity and the process speed of the S-RAM memory array 45 are sufficient, it is possible to hold the input data in the S-RAM memory array 45 in the case where the character information such as a music name being inputted during recording and the additional data such as recording date information.

Also, in the case where the character information is inputted during playback, it is possible to hold the input in the S-RAM memory array 45 in order to avoid losing the input.

Furthermore, in an embodiment of the present invention, a system has been explained, in which the S-RAM memory array is provided to the D-RAM memory. It is possible to provide a memory array as a non-volatile memory instead of the S-RAM memory array. The non-volatile memory could be an EEP-ROM or an EP-ROM or an NV-RAM (Non-Volatile-RAM).

Also, in an embodiment of the present invention, the select input terminal SEC for the control of signals is provided for selecting the S-RAM memory array 45 and the D-RAM memory array 44 as the memory array to which the data is written and from which the data is read. However, if a part of the address of the D-RAM memory array 44 is allotted as the address for the S-RAM memory array so that it is possible to clearly judge by the address only, whether the S-RAM memory array 45 or the D-RAM array 44 is used for data writing/reading, it becomes unnecessary to provide a special control (i.e., SEL port signal) from the memory controller 12 for selecting the memory arrays.

Furthermore, it is not always necessary to use the one-chip memory IC into which D-RAM and S-RAM or non-volatile memory are integrated. For example, it is possible to form the buffer RAM 13 as a whole as the S-RAM or the non-volatile memory.

Also, the memory section (S-RAM or non-volatile memory) for the U-TOC data may be provided in the interior or the exterior of the system controller 11 in addition to the buffer RAM 13.

In the foregoing embodiment, the recording/playback apparatus is provided. This may be a recording only apparatus. Also, the invention is not limited to the mini disc system but may be applied to a system where the supervisory information is stored in a semiconductor storage device.

As described above, according to the present invention, the supervisory information to be renewed in accordance with the recording operation is held in order in the memory section as the S-RAM or the non-volatile memory, so that it is possible to suppress the losing of recorded data to a minimum level. Then, the complicated backup circuit structure is not required and the power consumption is not remarkably increased. The present invention may be well applied to the present equipment and should be small in size and low in cost.

Various details of the invention may be changed without departing from either its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A recording apparatus for recording data in a recording region of a recording medium and supervisory information representing contents of said data recorded in said recording medium, comprising:

a recording means for recording said data and supervisory information in said recording medium;

a non-volatile memory for storing said supervisory information recorded in said recording medium; and a control means for renewing said supervisory information and storing it in said non-volatile memory at a certain time interval, wherein said control means includes means for confirming whether a recording of the renewed supervisory information to said recording medium has been implemented whenever a power is turned on so that the renewed supervisory information which has been stored in said memory can be recorded to said recording medium when said recording has not been implemented when the power is turned on.

2. The apparatus according to claim 1, wherein the non-volatile memory is a static random access memory.

3. The apparatus according to claim 1, wherein the control means performs an operation for renewing the supervisory information and storing it in the non-volatile memory at a time when a track number of recording data changes.

4. The apparatus according to claim 1, wherein the control means performs an operation for renewing the supervisory information and storing it in the non-volatile memory when a recording of serial data occurs at physically spaced locations on the recording medium.

5. The apparatus according to claim 1, wherein the control means performs an operation for renewing the supervisory information and storing it in the non-volatile memory whenever it stops the recording operation.

6. The apparatus according to claim 1, further comprising means for prohibiting an ejecting operation of the apparatus, the prohibiting means preventing the recording medium from being ejected during the recording operation of the apparatus until the apparatus terminates a writing operation of the renewed supervisory information stored in the memory to the recording medium.

7. A recording apparatus for recording data in a recording region of a recording medium and recording supervisory information representing contents of the data recorded in the recording medium, comprising:

recording means for recording the data and the supervisory information in the recording medium;

a non-volatile memory for the supervisory information;

a control means for renewing the supervisory information and storing it in the non-volatile memory at a certain time interval, the control means including means to detect, when power is initially supplied to the recording apparatus, whether a recording of the renewed supervisory information to the recording medium has been previously implemented and recording the renewed supervisory information which has been stored in the memory to the recording medium when it is detected that recording to the recording medium of the renewed supervisory information stored in the memory has not been implemented.

* * * * *